US010439894B2

(12) United States Patent
Hur et al.

(10) Patent No.: US 10,439,894 B2
(45) Date of Patent: Oct. 8, 2019

(54) COMMUNICATION APPARATUS, DISPLAY APPARATUS AND METHOD OF CONTROLLING THE SAME

(71) Applicant: SAMSUNG ELECTRONICS CO., LTD., Suwon-si, Gyeonggi-do (KR)

(72) Inventors: Jae Myung Hur, Seongnam-si (KR); Dong Wook Kim, Suwon-si (KR); Hyun Kyu Yun, Seoul (KR); Kyung Ik Cho, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 204 days.

(21) Appl. No.: 15/299,560

(22) Filed: Oct. 21, 2016

(65) Prior Publication Data
US 2017/0118089 A1 Apr. 27, 2017

(30) Foreign Application Priority Data
Oct. 22, 2015 (KR) .................. 10-2015-0147313

(51) Int. Cl.
G06F 3/048 (2013.01)
H04L 12/24 (2006.01)
(Continued)

(52) U.S. Cl.
CPC .......... *H04L 41/22* (2013.01); *H04L 12/2803* (2013.01); *H04L 12/4625* (2013.01); *H04L 43/0876* (2013.01); *H04L 69/18* (2013.01); *H04W 4/70* (2018.02); *H04W 52/02* (2013.01); *H04W 52/0283* (2013.01); *H04W 88/06* (2013.01); *G06F 3/14* (2013.01); *G09G 2370/16* (2013.01); *H04L 12/283* (2013.01); *H04W 4/80* (2018.02); *Y02D 70/00* (2018.01);
(Continued)

(58) Field of Classification Search
CPC .......... G06F 3/0481; G06F 3/14; H04W 4/20; G08C 17/02; H02J 3/14; H04L 41/22; H04L 43/0876
See application file for complete search history.

(56) References Cited

U.S. PATENT DOCUMENTS

2008/0080457 A1 4/2008 Cole
2009/0196210 A1 8/2009 Desai
(Continued)

FOREIGN PATENT DOCUMENTS

KR 10-1042196 6/2011

OTHER PUBLICATIONS

Search Report and dated Jan. 12, 2017 in counterpart International Patent Application No. PCT/KR2016/011565.
Extended European Search Report for EP Application No. 16857724.5 dated Jul. 2, 2018.

Primary Examiner — Haoshian Shih
(74) Attorney, Agent, or Firm — Nixon & Vanderhye P.C.

(57) ABSTRACT

Disclosed herein is a communication apparatus, display apparatus and method of controlling the same. A communication apparatus includes a communication unit including a plurality of communication modules, each communication module comprising communication circuitry, the communication unit supporting different wireless communication methods; and a communication controller configured to sequentially activate each of the plurality of communication modules in a predetermined order.

18 Claims, 13 Drawing Sheets

(51) Int. Cl.
*H04L 12/26* (2006.01)
*H04L 12/28* (2006.01)
*H04L 12/46* (2006.01)
*H04W 52/02* (2009.01)
*H04W 88/06* (2009.01)
*H04L 29/06* (2006.01)
*H04W 4/70* (2018.01)
*H04W 4/80* (2018.01)
*G06F 3/14* (2006.01)

(52) U.S. Cl.
CPC .............. *Y02D 70/10* (2018.01); *Y02D 70/14* (2018.01); *Y02D 70/142* (2018.01); *Y02D 70/144* (2018.01); *Y02D 70/162* (2018.01); *Y02D 70/166* (2018.01); *Y02D 70/20* (2018.01); *Y02D 70/26* (2018.01)

(56) References Cited

U.S. PATENT DOCUMENTS

| | | |
|---|---|---|
| 2014/0098247 A1 | 4/2014 | Rao et al. |
| 2014/0244768 A1 | 8/2014 | Shuman et al. |
| 2014/0266669 A1 | 9/2014 | Fadell et al. |
| 2014/0342670 A1 | 11/2014 | Kang et al. |
| 2014/0371922 A1* | 12/2014 | Weaver ............. H02J 3/14 700/276 |
| 2015/0071303 A1 | 3/2015 | Tajima |
| 2015/0179057 A1* | 6/2015 | Morimoto ............. G08C 17/02 340/12.5 |
| 2016/0139575 A1* | 5/2016 | Funes ................ H04L 12/2834 700/275 |

* cited by examiner

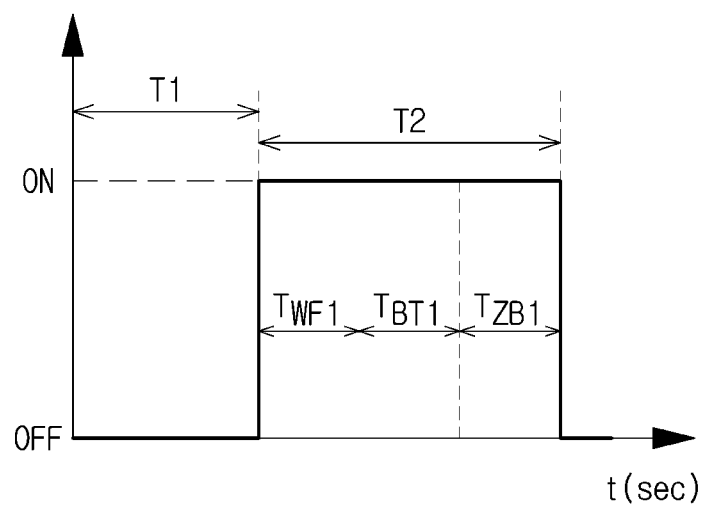

COMMUNICATION APPARATUS, DISPLAY APPARATUS AND METHOD OF CONTROLLING THE SAME

CROSS-REFERENCE TO RELATED APPLICATION

This application is based on and claims priority under 35 U.S.C. § 119 to Korean Patent Application No. 2015-0147313, filed on Oct. 22, 2015 in the Korean Intellectual Property Office, the disclosure of which is incorporated by reference herein in its entirety.

BACKGROUND

1. Field

The present disclosure relates generally to a communication apparatus supporting communication with an external device, a display apparatus including the communication apparatus, and a method of controlling the communication apparatus.

2. Description of Related Art

In general, the term 'Internet of things (IoT)' refers to an environment in which various devices are connected to one another via a wired/wireless network to share various information in everyday life. In this case, these devices which share various information via the wired/wireless network are referred to as IoT devices. In particular, technology whereby various indoor IoT devices are monitored and managed via the IoT may be referred to as smart home technology. In this case, research has been conducted on technology of managing the wired/wireless network described above in order to realize the smart home technology.

SUMMARY

Therefore, it is an aspect of the present disclosure to provide a communication apparatus for controlling activation of at least one communication, and a method of controlling the communication apparatus.

Additional aspects of the disclosure will be set forth in part in the description which follows and, in part, will be apparent from the description.

In accordance with an example aspect of the present disclosure, a communication apparatus includes a communication unit including a plurality of communication modules, each communication module comprising communication circuitry, the communication unit configured to support different wireless communication methods; and a communication controller configured to sequentially activate each of the plurality of communication modules in a predetermined order.

The communication controller may sequentially control the activation of the communication modules by sequentially supplying power to each of the communications modules in the predetermined order.

The communication controller may also collect access information of an Internet-of-thing (IoT) device operably connected to the communication unit, and may analyze a use pattern on the basis of the collected access information.

The communication controller may also set at least one of an active period and an inactive period based on the analyzed use pattern, wherein at least one communication module is activated in the active period and all of the plurality of communication modules are deactivated in the inactive period.

The communication controller may also set an activation order of the at least one communication module based on the analyzed use pattern.

The communication controller may also determine time zones in which a communication method is used by the IoT device based on the analyzed use pattern, and may set an active period and an inactive period in units of the time zones based on the time zones.

The communication controller may also control the activation of the plurality of communication modules based on a relative position and a frequency band of each of the plurality of communication modules.

The communication controller may also provide a user interface through which activation information is received using an Internet-of-thing (IoT) device including the communication apparatus therein or an IoT device connected to the communication apparatus via the communication unit.

The communication controller may also control the activation of the plurality of communication modules based on the activation information received via the user interface.

The communication controller may also provide information regarding efficiency expected from the activation information received via the user interface.

The communication controller may also transmit activation information to an Internet-of-thing (IoT) device operably connected to the communication apparatus via the communication unit.

In accordance with another example aspect of the present disclosure, a display apparatus includes an input including input circuitry configured to receive a control command; a communication apparatus including a plurality of communication modules, each communication module comprising communication circuitry, the communication apparatus configured to sequentially activate each of the plurality of communication modules in an predetermined order; and a display panel configured to display information processed by an activated communication module among the plurality of communication modules.

The communication apparatus may sequentially control the activation of the communication modules by sequentially supplying power to the at least one communication module in the predetermined order.

The communication apparatus may also collect access information of an Internet-of-thing (IoT) device and analyzes a use pattern based on the collected access information.

The communication apparatus may also set at least one of an active period and an inactive period based on the analyzed use pattern, wherein at least one communication module is activated in the active period and all of the communication modules are deactivated in the inactive period.

The communication apparatus may also set an activation order of the communication modules based on the analyzed use pattern.

The communication apparatus may also determine time zones in which a communication method is used by the IoT device based on the analyzed use pattern, and may set an active period and an inactive period in units of the time zones on the basis of the time zones.

The communication apparatus may also control the activation of the communication modules based on a relative position and a frequency band of each of the communication modules.

The display panel may display a user interface through which activation information regarding the communication apparatus is received.

The communication apparatus may control the activation of the communication modules based on the activation information received via the user interface.

Example embodiments of the present disclosure provide a communication apparatus, and method for controlling the same that control activation of the communication modules.

As described above, it is possible to optimize and/or improve activation of a communication module.

BRIEF DESCRIPTION OF THE DRAWINGS

These and/or other aspects of the disclosure will become apparent and more readily appreciated from the following detailed description, taken in conjunction with the accompanying drawings, in which like reference numerals refer to like elements, and wherein:

FIGS. 8A, 8B, and 8C are diagrams illustrating casein example in which an activation order is set based on relative positions of communication modules in accordance with an example embodiment of the present disclosure.

DETAILED DESCRIPTION

Figure 1:
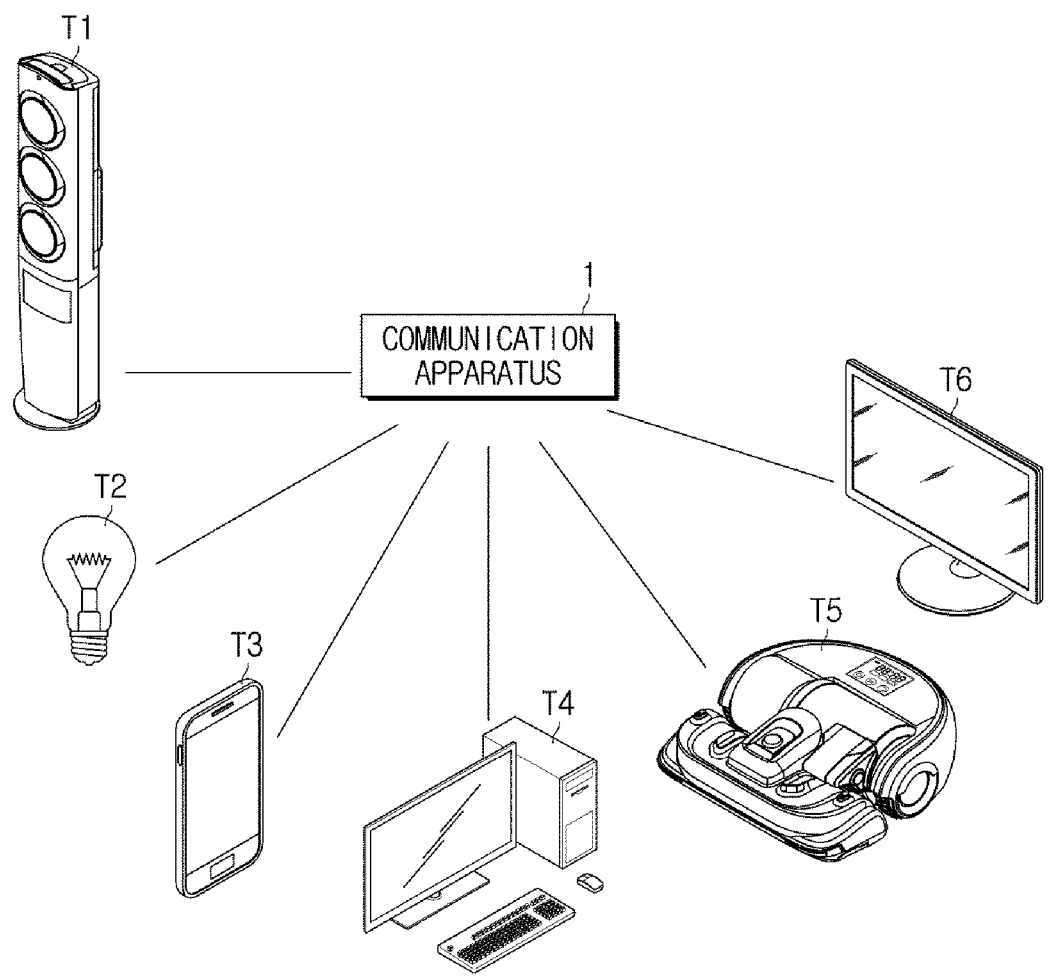
FIG. 1 is a diagram illustrating an example communication apparatus and a plurality of Internet-of-thing (IoT) devices connected via a home network in accordance with an example embodiment of the present disclosure.

Reference will now be made in greater detail below to example embodiments of the present disclosure, examples of which are illustrated in the accompanying drawings, wherein like reference numerals refer to like elements throughout.

Figure 2:
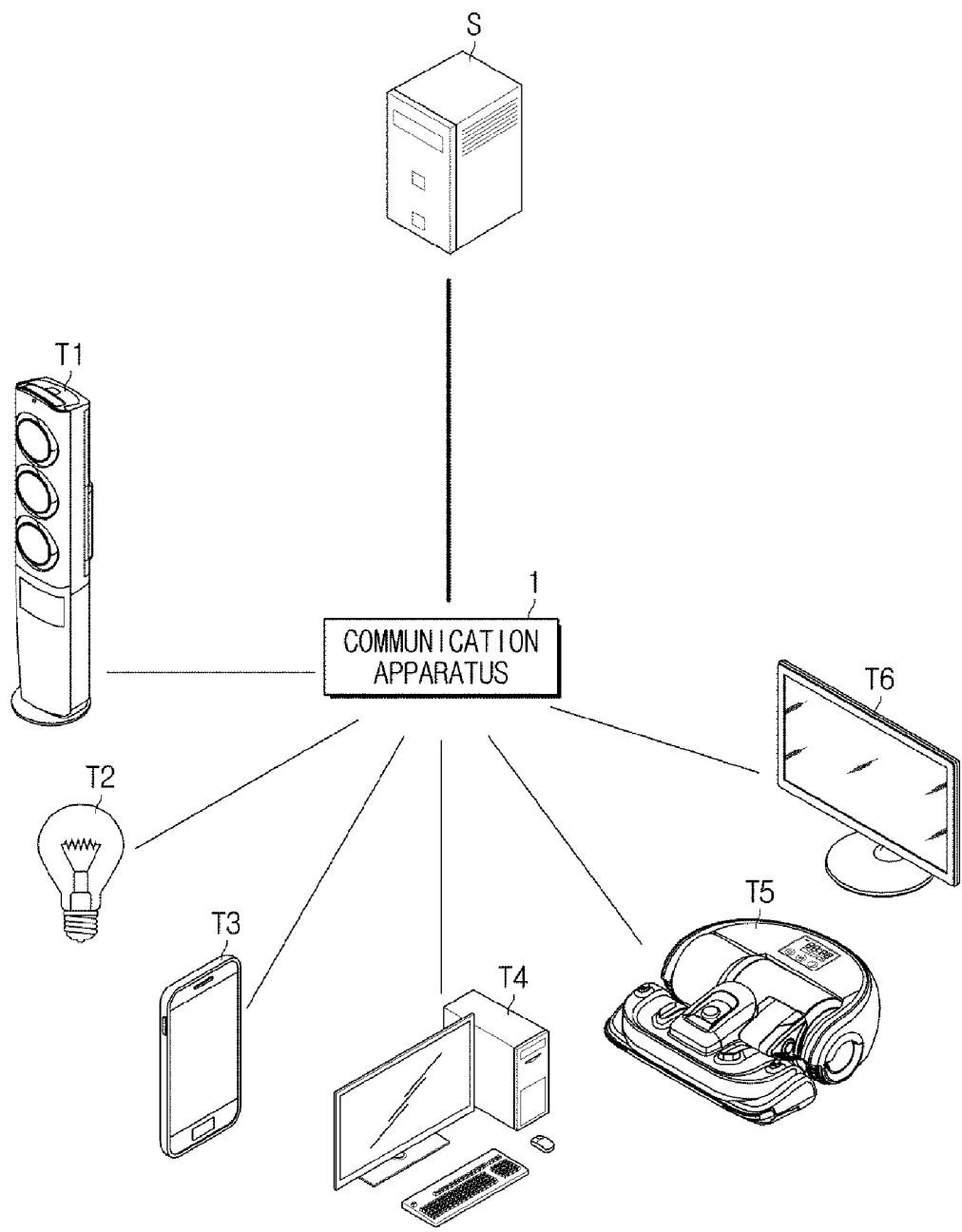
FIG. 2 is a diagram illustrating an example communication apparatus and a plurality of IoT devices connected to a web server via the communication apparatus in accordance with an example embodiment of the present disclosure.
Figure 3:
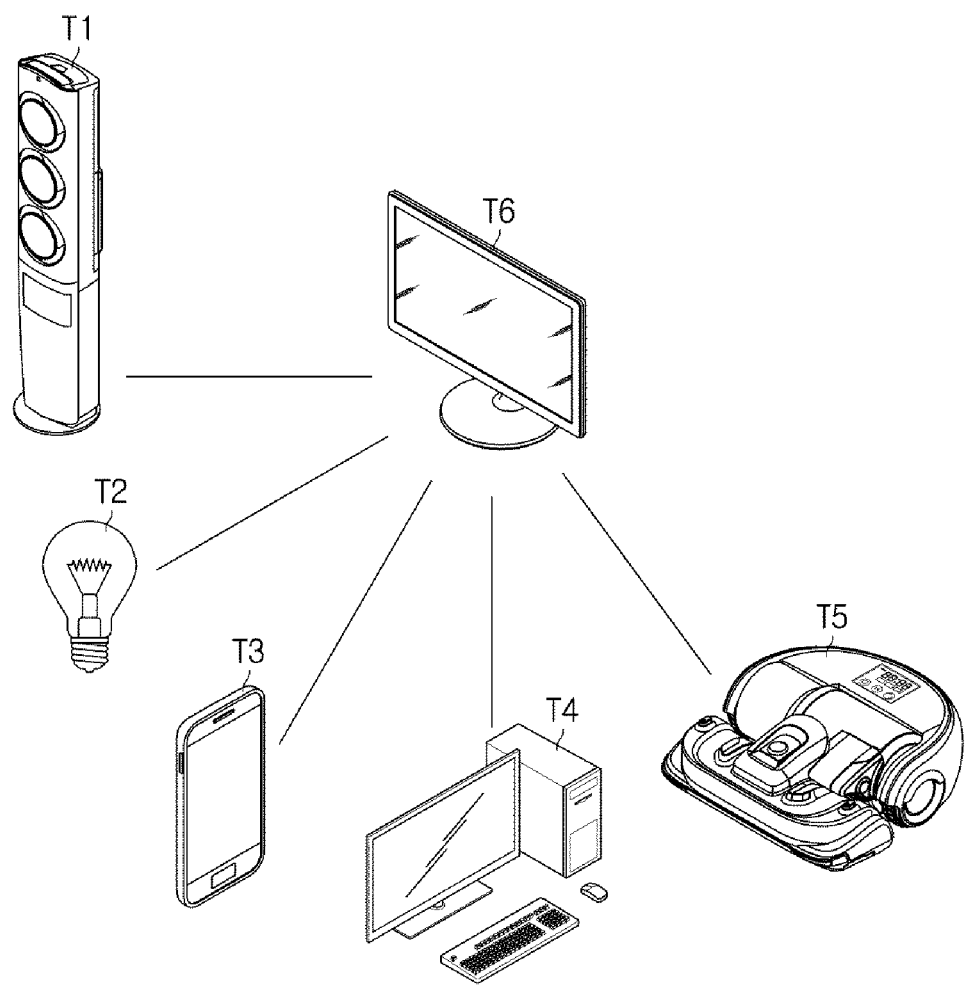
FIG. 3 is a diagram illustrating an example display apparatus including a communication apparatus therein and a plurality of IoT devices in accordance with an example embodiment of the present disclosure.

FIG. 1 is a diagram illustrating an example communication apparatus and a plurality of Internet-of-thing (IoT) devices connected via a home network in accordance with an example embodiment of the present disclosure. FIG. 2 is a diagram illustrating an example communication apparatus and a plurality of IoT devices connected to a web server via the communication apparatus in accordance with an example embodiment of the present disclosure. FIG. 3 is a diagram illustrating an example display apparatus including a communication apparatus therein and a plurality of IoT devices in accordance with an example embodiment of the present disclosure. In order to avoid redundancy, FIGS. 1 to 3 will be described together below.

Referring to FIG. 1, a plurality of IoT devices may be connected to one another via a home network. For example, the plurality of IoT devices may be understood as various devices which are used in everyday life and may access a home network via a communication unit included therein to exchange data with one another and process the data.

In an example embodiment, the IoT devices may include home appliances, e.g., a phone, a microwave oven, an air conditioner, a display apparatus such as a television (TV), an illumination device, a door lock, etc., or the like, but is not limited thereto. Furthermore, the IoT devices may include not only a laptop computer, a desktop computer, and a tablet personal computer (PC) but also a mobile terminal, such as a smart phone and a personal digital assistant (PDA), and a wearable terminal, such as a watch which is attachable to and detachable from a human body and a glasses-type wearable terminal, or the like. However, the IoT devices are not limited thereto, and include various devices which include a communication module therein to be connected to a network and include a processor including processing circuitry, such as, for example, and without limitation, a micro-control unit (MCU) to perform various operations. The home network may refer, for example, to a network providing not only a path via which data is exchanged between IoT devices but also a path via which an external device may be accessed to transmit data thereto or receive data therefrom.

The home network may be managed through a home hub. The home hub may refer, for example to a central management device managing a home network. The home hub may include a communication apparatus therein and may thus manage the home network in an integrated manner. The communication apparatus will be described in greater detail below.

The home hub may, for example, be installed indoors as a separate device. For example, an additional device such as a gateway server or an access point (AP) may be provided indoors to serve as the home hub. The gateway server may refer, for example, to a server which manages the home network in an integrated manner. One of the IoT devices or a separate server may, for example, serve as the gateway server. The AP may refer, for example, to a communication apparatus serving as a base station of a communication network. For example, an air conditioner T1, an illumination device T2, a smart phone T3, a desktop computer T4, a robot cleaner T5, and a display apparatus T6 may be connected to one another via a communication apparatus 1 to share various information with one another as illustrated in FIG. 1.

Alternatively, one of the IoT devices may itself serve as the home hub. In an example embodiment, the display apparatus T6 may include a communication apparatus therein and may thus serve as a home hub connecting the air conditioner T1, the illumination device T2, the smart phone T3, the desktop computer T4, and the robot cleaner T5 as illustrated in FIG. 3. However, devices which may serve as the home hub are not limited thereto and any of various IoT devices may serve as the home hub. The display apparatus T6 including the communication apparatus therein will be described in greater detail below.

The communication apparatus 1 may support connection between these IoT devices to establish communication between the IoT devices, and may also support connection to an external web server. For example, the communication apparatus 1 may support connection between the IoT devices T1, T2, T3, T4, T5, and T6 and an external web server S as illustrated in FIG. 2. Thus, a user may download desired content using the IoT devices T1, T2, T3, T4, T5, and T6 but example embodiments of the present disclosure are not limited thereto.

The communication apparatus managing the home network will be described in greater detail below.

Figure 4:
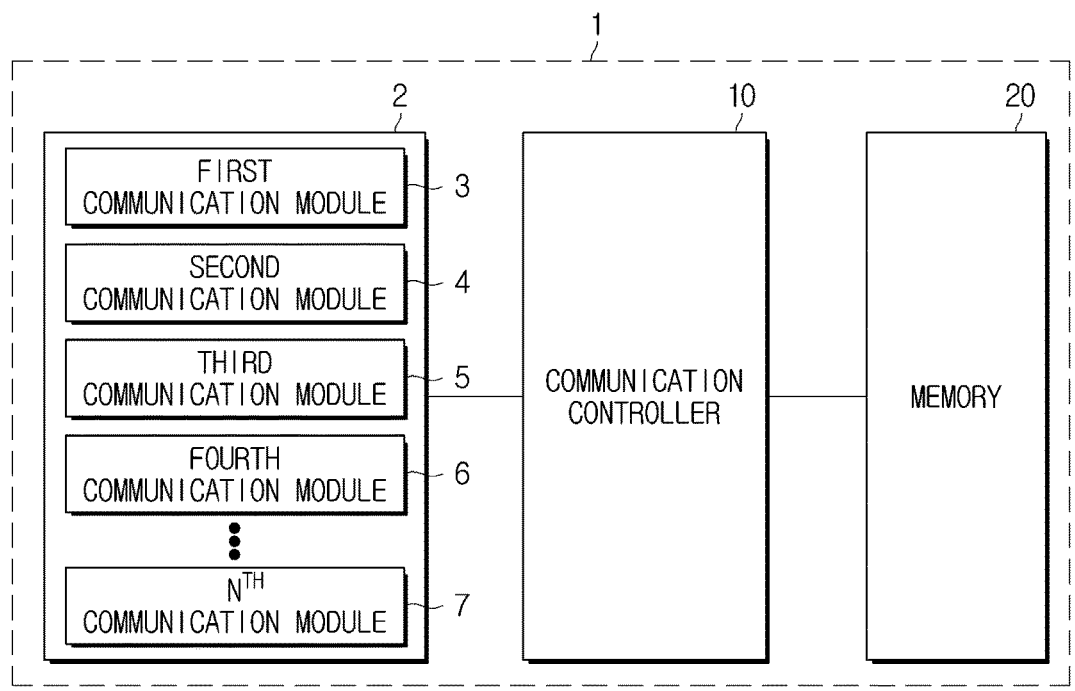
FIG. 4 is a block diagram illustrating an example communication apparatus which controls activation of a communication module in accordance with an example embodiment of the present disclosure.
Figure 5:
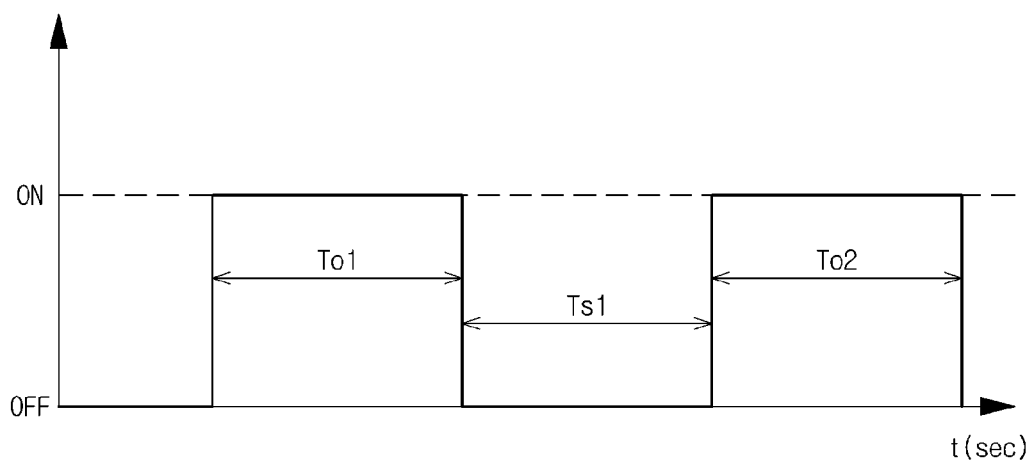
FIG. 5 is a diagram illustrating an example sequential control of an active period and an inactive period of a communication module in accordance with an example embodiment of the present disclosure.
Figure 6:
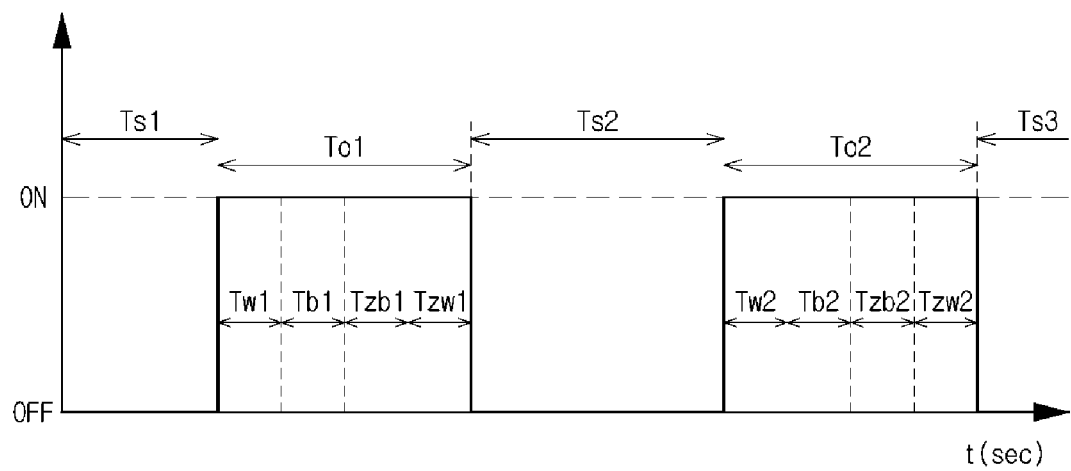
FIG. 6 is a diagram illustrating an example sequential control of activation cycles in accordance with an example embodiment of the present disclosure.
Figure 7:
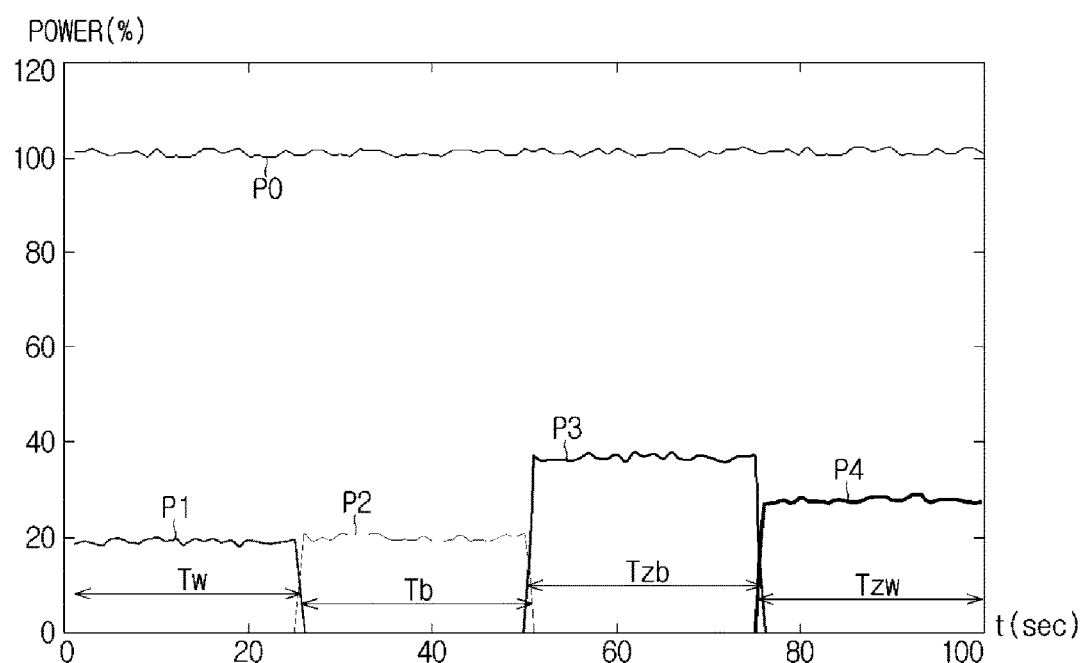
FIG. 7 is a graph illustrating the effect of reducing power consumption as activation of a communication module is controlled in accordance with an example embodiment of the present disclosure.
Figure 8A:
Figure 8C:
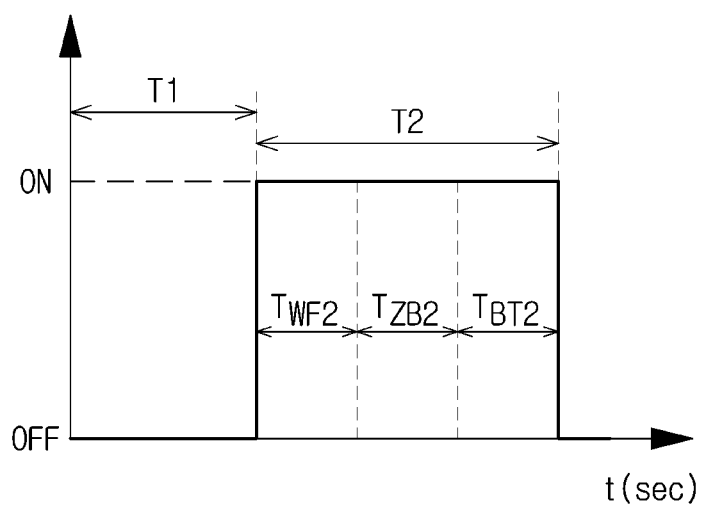

FIG. 4 is a block diagram illustrating an example communication apparatus which controls activation of a communication module in accordance with an example embodiment of the present disclosure. FIG. 5 is a diagram illustrating example sequential control of an active period and an inactive period of a communication module in accordance with an example embodiment of the present disclosure. FIG. 6 is a diagram illustrating example sequential control of activation cycles in accordance with an example embodiment of the present disclosure. FIG. 7 is a graph illustrating the effect of reducing power consumption as activation of a communication module is controlled in accordance with an example embodiment of the present disclosure. FIGS. 8A, 8B, and 8C are diagrams illustrating casein example in which an activation order is set based on relative positions of communication modules in accordance with an example embodiment of the present disclosure. In order to avoid redundancy, FIGS. 4 to 8 will be described together below.

As illustrated in FIG. 4, the communication apparatus 1 includes a communication unit 2, a communication controller 10, and a memory 20. For example, at least one among the communication unit 2, the communication controller 10, and the memory 20 may be integrated on a system-on-chip (SoC) included in the communication apparatus 1, and operated by a processor.

However, more than one SoC may be included in the communication apparatus 1 and thus at least one among the communication unit 2, the communication controller 10, and the memory 20 is not limited to being integrated only on one SoC.

The communication unit 2 may include at least one communication module comprising communication circuitry supporting a communication method. Examples of the communication method include a wireless communication method and a wired communication method. For example, the wireless communication method may refer, for example, to a communication method through which a signal containing data may be wirelessly transmitted or received. Examples of the wireless communication method include, but are not limited to, various communication methods such as 3Generation (3G), 4Generation (4G), a wireless local area network (LAN), Wi-Fi, Bluetooth, Zigbee, Wi-Fi Direct (WFD), Ultra-wideband (UWB), infrared data association (IrDA) communication, Bluetooth low energy (BLE), near-field communication (NFC), Z-Wave, etc.

The wired communication method may refer, for example, to a communication method through which a signal containing data may be transmitted or received via wire. Examples of the wired communication method include peripheral component interconnect (PCI), PCI-express, a Universe Serial Bus (USB), etc. but are not limited thereto.

For example, the communication unit 2 may transmit a radio signal to or receive a radio signal from an IoT device via a base station according to a communication method such as 3G, 4G, or the like. In addition, the communication unit 2 may transmit a radio signal containing data to or receive the radio signal from an IoT device which is within a predetermined distance therefrom according to various wireless communication methods such as a wireless LAN, Wi-Fi, Bluetooth, Z-wave, Zigbee, WFD, UWB, IrDA communication, BLE, NFC, etc.

For example, the communication unit 2 may be configured by integrating thereon at least one communication module comprising communication circuitry supporting the communication methods described above. For example, each of the at least one communication module corresponding to one of the communication methods may be individually embodied as a single chip including various communication circuitry and integrated on the communication unit 2.

For example, as illustrated in FIG. 4, N communication modules (e.g., each including various communication circuitry) 3, 4, 5, 6, and 7 may be integrated on the communication unit 2. In an example embodiment, the first communication module 3 may include various communication circuitry, such as, for example, a Wi-Fi communication module supporting Wi-Fi, the second communication module 4 may include various communication circuitry, such as, for example, a Bluetooth communication module supporting Bluetooth, the third communication module 5 may include various communication circuitry, such as, for example, a Zigbee communication module supporting Zigbee, and the fourth communication module 6 may include various communication circuitry, such as, for example, a Z-Wave communication module supporting Z-Wave.

Each of these communication modules may include various communication circuitry and may be designed to be activated when power is supplied thereto. In addition, two or more modules among the above communication modules may be combined together to support a plurality of communication methods but example embodiments of the present disclosure are not limited thereto.

The communication unit 2 including therein communication modules respectively including communication circuitry supporting Wi-Fi, Bluetooth, Zigbee, and Z-Wave among the above communication methods will be described as an example below but embodiments which will be described below are not limited thereto and any device including therein communication modules supporting various communication methods is applicable as the communication unit 2.

The communication apparatus 1 may include the memory 20 as illustrated in FIG. 4. For example, the memory 20 may be embodied using at least one among a flash memory type storage medium, a hard disk type storage medium, a multimedia card micro type storage medium, a card type memory (e.g., an SD or XD memory or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. However, embodiments of the present disclosure are not limited thereto and the memory 20 may be any of other type storage media known to this art.

The memory 20 may store data regarding activation information of communication modules. For example, the activation information may include data regarding an activation cycle, an activation time, an activation order, etc., but is not limited thereto.

For example, the activation information may be stored in the form of data or may be stored in the form of an application program embodied as an algorithm for setting activation to be adapted to the design of the communication unit 2 as will be described in greater detail below. The communication controller 10 may control the communication modules 3, 4, 5, 6, and 7 included in the communication unit 2 using the activation information. The activation information may be continuously updated via a communication network, as will be described in greater detail below.

The memory 20 may further store data regarding access information of an IoT device. For example, the data regarding the access information of the IoT device may include various information which may be collected during a connection between the IoT device and the communication apparatus 1 via a communication network, e.g., data which may be collected when the IoT device and the communication apparatus 1 are connected to each other and data which may be collected when the IoT device is used after the IoT device and the communication apparatus 1 are connected to each other. The memory 20 may store data regarding history information regarding use of the communication network by the IoT device.

The memory 20 may store an application program embodied as an algorithm for analyzing the above access information. For example, the application program may include, for example, a deep-learning program which collects and analyzes a use pattern.

For example, the application program may be distributed by a designer of the communication apparatus 1. Furthermore, the application program may be updated by the designer. For example, the application program may be automatically updated in a predetermined cycle via a communication network. For example, the predetermined cycle may be set by the designer or a user.

Alternatively, the application program may be manually updated. For example, a user may update the application program by connecting a storage medium storing data regarding an update of the application program to the communication apparatus 1 via, for example, a USB port. Thus, the communication apparatus 1 in accordance with an example embodiment may more precisely derive a use pattern from the access information using a latest-version application program and lower an error occurrence rate.

The memory 20 may store data regarding an analysis result drawn from the access information of the IoT device. For example, the memory 20 may store data regarding an access pattern, a use pattern, etc. of the IoT device. In addition, the memory 20 may store various data needed to connect the communication apparatus 1 and the IoT device via a communication network but embodiments of the present disclosure are not limited thereto.

The communication controller 10 may control overall operations of the communication apparatus 1. For example, the communication controller 10 may be embodied using a processor including processing circuitry, such as, for example, and without limitation, an MCU. The communication controller 10 and the memory 20 may be each embodied as a single chip but are not limited thereto and may be integrally formed as a single chip.

For example, the communication controller 10 may control operations of elements of the communication apparatus 1 by generating a control signal for controlling these elements. In an example embodiment, the communication controller 10 may control activation of the communication modules 3, 4, 5, 6, and 7 included in the communication unit 2. The communication controller 10 may control the communication modules 3, 4, 5, 6, and 7 to be individually 'on' or 'off' by controlling the supply of power thereto using the control signal. In this example, the communication controller 10 may sequentially supply power to at least one among the communication modules 3, 4, 5, 6, and 7 in a predetermined order such that a specific communication module among the communication modules is activated at a specific time.

As described above, in the communication unit 2, the first communication module 3 may include various communication circuitry realizing a Wi-Fi communication module supporting Wi-Fi, the second communication module 4 may include various communication circuitry realizing a Bluetooth communication module supporting Bluetooth, the third communication module 5 may include various communication circuitry realizing a Zigbee communication module supporting Zigbee, and the fourth communication module 6 may include various communication circuitry realizing a Z-Wave communication module supporting Z-Wave.

In this example, power consumption is very high when all of the plurality of communication modules are activated. Furthermore, when frequency bands respectively used by the plurality of communication modules are the same or similar, co-existence may occur due to interference. For example, in Wi-Fi, Bluetooth, and Zigbee, a frequency band between 2.4 GHz to 2.5 GHz is used and thus interference may frequently occur.

Thus, the communication controller 10 may control the plurality of communication modules to be sequentially activated to reduce interference and power consumption. For example, the communication controller 10 may set an operating time of each of the plurality of communication modules based on a communication method, and activate each of the communication modules in the operating time thereof. For example, the communication apparatus 1 in accordance with an example embodiment may sequentially activate the plurality of communication modules based on a time-division method, thereby minimizing and/or reducing interference.

For example, the communication controller 10 may determine an activation cycle of a communication module and control activation of the communication module based on the determined activation cycle. For example, the activation cycle may refer, for example, to a time period between when the communication module is activated and when the communication module is activated again. In other words, the activation cycle may refer, for example, to a standby time until the communication module is operated again after it is operated. The activation cycle may be determined by the lengths of an inactive period and an active period, as will be described in greater detail below.

The communication controller 10 in accordance with an example embodiment may activate a communication module and then deactivate it for a predetermined time to supply power to an element which performs an operation different from that of the communication module. For example, the communication controller 10 may not supply power to the communication unit 2 for the predetermined time.

The communication controller 10 may set an active period in which at least one communication module is activated, and an inactive period in which all communication modules are deactivated. Thus, in the communication apparatus 1 in accordance with an example embodiment, power may be smoothly supplied to another apparatus requiring power to be supplied thereto. Furthermore, the communication apparatus 1 may decrease a whole threshold voltage of an apparatus including the communication apparatus 1 therein so that elements of the apparatus may be smoothly operated.

When the communication apparatus 1 is included in the display apparatus T6, the display apparatus T6 may supply power to various elements thereof, such as a display panel, an image processor, a speaker, etc., as well as the communication apparatus 1. Since a threshold voltage needed to operate the elements of the display apparatus T6 in an inactive period is low, an average threshold voltage is low. An example in which the communication apparatus 1 is included in the display apparatus T6 will be described in greater detail below.

For example, the communication controller 10 may set active periods To1 and To2 in which at least one communication module is activated, and an inactive period Ts1 in which all communication modules are deactivated as illustrated in FIG. 5. In this example, the communication controller 10 may set the active periods To1 and To2 in various ways, and subdivide each of the active periods To1 and To2 into activation times in units of the communication modules, as will be described in greater detail below.

Alternatively, the communication controller 10 may activate all communication modules in an active period or may set activation times in units of the communication modules to sequentially activate the communication modules.

For example, the communication controller 10 may activate only one communication module in a specific time period. For example, time periods during which the communication modules are respectively activated may be referred to as activation times. Referring to FIG. 6, the communication controller 10 may divide an active period into four activation times to sequentially activate communication modules.

For example, Tw1 and Tw2 may denote activation times during which a Wi-Fi communication module is activated, Tb1 and Tb2 may denote activation times during which a Bluetooth communication module is activated, Tzb1 and Tzb2 may denote activation times during which a Zigbee communication module is activated, and Tzw1 and Tzw2 may denote activation times during which a Z-Wave communication module is activated. Furthermore, the first active period To1 may be divided into the activation times Tw1, Tb1, Tzb1, and Tzw1, and the second active period To2 may be divided into the activation times Tw2, Tb2, Tzb2, and Tzw2.

For example, the communication controller 10 may set the activation times Tw1, Tb1, Tzb1, and Tzw1 of the active period To1 corresponding to these communication modules to be the same. In an example embodiment, as illustrated in FIG. 6, the activation times Tw1, Tb1, Tzb1, and Tzw1 corresponding to these communication modules may, for example, be 5 ms. Thus, a time of the active period To1 may be 20 ms.

As another example, the communication controller 10 may adjust the activation times corresponding to these communication modules. For example, the communication controller 10 may differently set power supply times for the communication modules. In an example embodiment, as illustrated in FIG. 6, the communication controller 10 may set the activation time Tw1 for the Wi-Fi communication module to be 7 ms, the activation time Tb1 for the Bluetooth communication module to be 3 ms, the activation time Tzb1 for the Zigbee communication module to be 2 ms, and the activation time Tzw1 for the Z-Wave communication module to be 8 ms. In this example, an activation cycle of the Bluetooth communication module is Tw1+Tzb1+Tzw1+Ts2.

For example, the activation times for the communication modules may be set beforehand by the designer of the communication apparatus 1. For example, data regarding activation information, such as an activation cycle and an activation time of each of the communication modules, an activation order of the communication modules, etc., may be stored in the memory 20. Alternatively, a method of setting the above activation information may be embodied in the form of an application program and stored in the memory 20. Thus, the communication controller 10 may control activation of at least one communication module using the data stored in the memory 20 without a user's additional setting.

The above data, the application program, or the like may be continuously updated. For example, the communication controller 10 may access a web using at least one among the communication modules in a predetermined cycle or based on a user's request. Thus, the communication controller 10 may receive data regarding an update of the data or the application program stored in the memory 20 from an external server or the like using the at least one communication module, and update the data or the application program. For example, the communication controller 10 in accordance with an example embodiment may control the communication unit 2 to access a communication network and update the data or the application program by receiving data regarding the activation information, thereby optimizing and/or improving activation of a communication module.

As another example, the activation information such as the activation cycle, the activation time, the activation order, etc. may be set by a user. The user may directly input the activation information via input circuitry of an input unit of an IoT device.

In an example embodiment, when the communication apparatus 1 is included in the display apparatus T6, a user may input an activation cycle, an activation time, an activation order, etc. which he or she wants via input circuitry of an input unit of the display apparatus T6. For example, the communication apparatus 1 in accordance with an example embodiment may enable the user to set the activation cycle, the activation time, the activation order, etc. while reflecting his or her life pattern, use pattern, etc., thereby increasing the user's convenience.

In addition, the user may input the activation information using an IoT device connected to the communication apparatus 1 via a communication network. The communication controller 10 may receive the activation information from the IoT device via the communication unit 2 and control activation of at least one communication module on the basis of the activation information.

In this example, the communication controller 10 may provide a user interface through which the activation information may be input from a user. Alternatively, the display apparatus T6 or the IoT device may provide the user interface.

In an example embodiment, the user interface may be a graphical user interface (GUI) graphically representing a screen displayed on a display to receive various information, control commands, etc. more conveniently from a user. Thus, the user may input the activation information more conveniently through the user interface. An application program realizing the user interface may be stored in the memory 20 of the communication apparatus 1, a memory of the IoT device as described above, or an external server but is not limited thereto.

In an example embodiment, the communication controller 10 may further provide information regarding efficiency expected from the activation information received through the user interface, so that a user may intuitively grasp a result expected based on the activation information.

For example, the information regarding the efficiency may refer, for example, to information expected when the communication apparatus 1 is operated based on the activation information. For example, the information regarding the efficiency may include estimated power consumption in the communication apparatus 1, an estimated data packet loss rate, etc., and may further include various well-known information needed to grasp the efficiency of operating the communication apparatus 1. For example, a user may set the activation information while checking a change in the estimated power consumption, etc.

The information regarding efficiency may be obtained, for example, through a simulation. For example, the memory 20 may store an application program which obtains the information regarding the efficiency by conducting a simulation based on the activation information. The communication controller 10 may draw an expected efficiency using the application program stored in the memory 20.

Alternatively, the memory 20 may store information regarding an efficiency corresponding to each of a plurality of pieces of activation information, and thus the communication controller 10 may detect and provide information regarding an efficiency corresponding to active information received from the memory 20.

However, example embodiments of the present disclosure are not limited to storing in the memory 20 the above application program or data of the information regarding the efficiency corresponding to each of the plurality of pieces of activation information. For example, the application program, the data, etc. may be stored in an external server or the like. Thus, the communication controller 10 may control the communication unit 2 to transmit the activation information to the external server S or the like. The communication controller 10 may receive information regarding an estimated efficiency from the external server S or the like and provide it, thereby increasing a storage capacity of the memory 20 and reducing the amount of calculation.

For example, when the communication apparatus 1 is included in the display apparatus T6, the communication controller 10 may display the user interface providing estimated results on a display panel 52. Alternatively, the estimated results may be provided to a user via various devices such as a display panel or a speaker included in an IoT device but embodiments of the present disclosure are not limited thereto. Activation times corresponding to communication modules may be set based on a result of analyzing use of a communication network by an IoT device. The communication controller 10 may adjust at least one among the activation times corresponding to the communication modules and an activation cycle of the communication unit 2 by analyzing a use environment through an IoT device.

For example, the communication controller 10 may collect a user's access information and store it in the memory 20. Thus, the communication controller 10 may analyze the user's use pattern on the basis of the access information and set at least one of an activation time and an activation cycle corresponding to each of the communication modules.

For example, the memory 20 or an external device may store a program embodied as an algorithm for drawing a use pattern, etc. by analyzing access information of an IoT device as described above. Thus, the communication controller 10 may control activation of a communication module based on an analysis result obtained through the above program.

For example, the access information may include various information, such as, for example, and without limitation, a communication network access duration, a current status of use of a communication method, a communication network access time zone, etc. In addition, the access information may include information which may be collected when the communication network is accessed, such as, for example, and without limitation, information which may be collected when pairing is performed and information which may be collected when the communication network is used after the communication network is accessed, but embodiments of the present disclosure are not limited thereto.

In an example embodiment, the communication controller 10 may generate the access information in the form of log data and store it in the memory 20. The log data is not limited to being stored in the memory 20 and may be stored in an external device.

The communication controller 10 may control activation of a communication module in various ways, based on a result of analyzing a user's use pattern. For example, the communication controller 10 may control at least one of an activation time and an activation cycle based on a communication network access duration of an IoT device.

In an example embodiment, the communication controller 10 may control an active period based on a number of times an IoT device accesses the communication network as the result of analyzing a user's use pattern. As the number of times the IoT device accesses the communication network increases, the communication controller 10 may set the active period to be longer or more frequent.

Alternatively, when a number of times a pairing request signal is received from the IoT device is large, the communication controller 10 may be set the inactive period to be shorter and the active period to be longer, so that pairing may be performed more quickly. For example, the communication controller 10 may adjust the activation cycle by adjusting a ratio between the inactive period and the active period. In an example embodiment, the communication controller 10 may adjust the activation cycle by adjusting a ratio between inactive periods Ts1 and Ts2 and active periods To1 and To2 of FIG. 6.

Furthermore, the communication controller 10 may increase an activation time of a communication module supporting a frequently used communication method based on a user's pattern of use of communication methods. On the other hand, the communication controller 10 may maintain or reduce an activation time of a communication module supporting a hardly used communication method.

For example, the communication controller 10 may increase the activation cycle but may reduce an activation time of a communication module corresponding to a communication method which a user does not frequently use so as to maintain the activation cycle constant. Thus, pairing may be performed more quickly between the communication apparatus 1 and an IoT device, thereby reducing power consumption.

For example, as a communication method is frequently used between an IoT device and the communication apparatus 1, an activation time thereof may be increased. In an example embodiment, the communication controller 10 may adjust a ratio between the times Tw1, Tb1, Tzb1, and Tzb2 of FIG. 6 based on a degree to which the communication method is used, e.g., the frequency of use of the communication method.

In another example embodiment, the communication controller 10 may analyze a time zone in which a communication network is used, and adjust the activation cycle and the activation time. For example, when a user does not stay indoors in the daytime and thus does not use a communication network in the daytime and uses it mainly in the nighttime, the communication controller 10 may set the activation cycle to be long in the daytime and to be short in the nighttime.

For example, the communication controller 10 may reduce unnecessary power consumption for driving the communication unit 2 by setting inactive periods to be long, for example, during the daytime. For example, in FIG. 6, the durations of the active periods may be the same or be different from each other. In an example embodiment, the communication controller 10 may respectively set the first and second active periods To1 and To2 of FIG. 6 to be 20 ms and 30 ms based on a time zone in which the communication network is used but embodiments of the present disclosure are not limited thereto.

Furthermore, the communication controller 10 may adjust an activation order of communication modules as well as activation times and activation cycles thereof based on a result of analyzing the time zone. Even if a communication module is powered off, communication established by another communication module using the same frequency band as the communication module may be influenced by the communication module. For example, when a Bluetooth communication module is powered off and a Wi-Fi communication module is powered on and used, they use the same frequency band and thus interference may occur.

Thus, the communication controller 10 may control an activation order based on a user's use pattern such that a communication module supporting a communication method which is frequently used is first activated. For example, when a result of analyzing the user's use pattern reveals that a Bluetooth communication method, a Wi-Fi communication network, a Zigbee method, and a Z-Wave method are sequentially used, the communication controller 10 may set the activation order as an order of a Bluetooth communication module, a Wi-Fi communication module, a Zigbee communication module, and a Z-Wave communication module.

Although FIG. 6 illustrates the activation order as an order of the Wi-Fi communication module, the Bluetooth communication module, the Zigbee communication module, and the Z-Wave communication module, embodiments of the present disclosure are not limited thereto and the communication controller 10 may differently set the activation order. Thus, the communication apparatus 1 in accordance with an example embodiment may prevent and/or reduce interference from occurring as much as possible in a communication network which a user mainly uses. However, embodiments of the present disclosure are not limited thereto and the communication controller 10 may determine the activation order based, for example, on a user's settings.

The communication controller 10 may set an activation order of communication modules such that frequency bands to be used do not overlap with each other. For example, Bluetooth, Wi-Fi, and Zigbee use a frequency band between 2.4 GHz to 2.5 GHz, whereas Z-Wave uses a frequency band between 800 MHz to 900 MHz as described above. In this example, the communication controller 10 may set the activation order such that a communication method which is most frequently used is first activated and Z-Wave is secondly activated. Thus, degradation of a service quality of a communication method which a user frequently uses may be minimized and/or reduced. Meanwhile, an IoT device may transmit a pairing signal to perform pairing with the communication apparatus 1. In this example, the communication controller 10 may receive only a pairing signal activated in a corresponding time period based on the activation cycle. Thus, when pairing is performed, the communication controller 10 continuously supplies power to a paired communication module so that the communication apparatus 1 may transmit data to or receive data from the IoT device.

In this example, the communication controller 10 transmits activation information to the IoT device so as to smoothly perform pairing. For example, the activation information includes at least one among information regarding an active period, information regarding an activation time of each of communication modules in the active period, and information regarding an activation order as described above. For example, the communication controller 10 may transmit data regarding a current status of activation of the communication modules to the IoT device. Thus, the IoT device may transmit the pairing signal according to the activation information when a communication module supporting a desired communication method to be paired is activated, thereby more smoothly performing pairing.

After pairing is performed, the communication controller 10 may continuously activate the paired communication module supporting the desired communication method but may, for example, activate the communication module only when a request signal is received from the paired IoT device.

When the paired communication module is continuously activated, power consumption is large. Although the communication module is paired, a process corresponding to a request signal need be performed only when the request signal is received from the IoT device and thus the communication module need not be continuously activated.

Thus, even after pairing is performed, the communication controller 10 in accordance with an example embodiment may control activation of a communication module such that the activation of the communication module is maintained only when a request signal is received and a process corresponding to the request signal is performed while the communication module is activated. For example, the communication controller 10 in accordance with an example embodiment may control the activation of the communication module before and after the communication module is paired with an IoT device. In this example, a method of controlling the activation of the communication module is as described above and the description will not be repeated here.

FIG. 7 is a diagram illustrating example amounts of power consumption when all communication modules integrated on the communication unit 2 were activated and when all the communication modules are sequentially activated through control of activation of the communication modules in accordance with an example embodiment.

In FIG. 7, P0 represents an amount of power consumption when all communications modules, for example, a Wi-Fi communication module, a Bluetooth communication module, a Z-Wave communication module, and a Zigbee communication module, are activated. P1 represents an amount of power consumption when the Wi-Fi communication module is activated. P2 represents an amount of power consumption when the Bluetooth communication module is activated. P3 represents an amount of power consumption when the Zigbee communication module is activated. P4 represents an amount of power consumption when the Z-Wave communication module is activated.

As illustrated in FIG. 7, if the amount of power consumption P0 is about 100%, the amounts of power consumption P1, P2, and P3 are in a range of about 20% to 40% of the amount of power consumption P0. Thus, the amount of power consumption is remarkably reduced by the communication apparatus 1 in accordance with an example embodiment, compared to that when all communication modules are activated.

In addition to the above method, a method of minimizing and/or reducing interference will be described in greater detail below.

For example, the communication unit 2 may be embodied by hardware (e.g., circuitry) to minimize and/or reduce interference. In an example embodiment, as the distance between communication modules decreases, interference increases. For example, as the distance between communication modules using the same frequency band or similar frequency bands decreases, interference increases. Thus, the communication unit 2 may be designed to secure a certain distance between communication modules using the same frequency band or similar frequency bands. For example, the communication apparatus 1 may be designed to include communication modules therein in consideration of a frequency band of each of the communication modules.

Furthermore, the communication controller 10 may minimize and/or reduce software interference by setting an activation order of communication modules based on relative positions of already designed communication modules and a frequency band of each of the communication modules.

For example, the communication controller 10 may set an activation order such that consecutive activation of communication modules which use the same frequency band or similar frequency bands and which are relatively close to one another is minimized and/or reduced.

In an example embodiment, referring to FIG. 8A, the communication unit 2 may include, for example, and without limitation, a Wi-Fi communication module WF (e.g., including Wi-Fi communication circuitry), a Bluetooth communication module BT (e.g., including Bluetooth communication circuitry), and a Zigbee communication module ZB (e.g., including Zigbee communication circuitry). In this example, the communication unit 2 may be designed such that the Wi-Fi communication module WF and the Bluetooth communication module BT are adjacent to each other and the Bluetooth communication module BT and the Zigbee communication module ZB are adjacent to each other as illustrated, for example, in FIG. 8A.

In this example, the Wi-Fi communication module WF, the Bluetooth communication module BT, and the Zigbee communication module ZB use a frequency band between 2.4 GHz and 2.5 GHz and interference may occur between them as described above. In this example, referring to FIG. 8A, the Wi-Fi communication module WF, the Bluetooth communication module BT, and the Zigbee communication module ZB are adjacent to one another and thus interference may occur between them.

For example, interference occurs more frequently as the difference in spacing or position between communication modules decreases. For example, interference may increase when the Wi-Fi communication module WF and the Bluetooth communication module BT are consecutively activated more than when the Wi-Fi communication module WF and the Zigbee communication module ZB are consecutively activated.

Thus, the communication controller 10 may set an activation order in consideration of (e.g., based on) relative positions of communication modules such that interference is minimized and/or reduced. For example, in FIGS. 8B and 8C, T1 represents an inactive period in which communication modules are deactivated, and T2 represents an active period in which at least one communication module is activated. $T_{WF1}$ and $T_{WF2}$ represent time periods during which the Wi-Fi communication module WF is activated. $T_{BT1}$ and $T_{BT2}$ represent time periods during which the Bluetooth communication module BT is activated. $T_{ZB1}$ and $T_{ZB2}$ represent time periods during which the Zigbee communication module ZB is activated.

Referring to FIG. 8B, when the Wi-Fi communication module WF is activated, the Bluetooth communication module BT is activated and then the Zigbee communication module ZB is activated, interference may occur, since all the Wi-Fi communication module WF, the Bluetooth communication module BT, and the Zigbee communication module ZB use the same frequency band. For example, interference increases more when the Wi-Fi communication module WF and the Bluetooth communication module BT which are adjacent to each other are consecutively activated and the Bluetooth communication module BT and the Zigbee communication module ZB which are adjacent to each other are consecutively activated.

Thus, the communication controller 10 in accordance with an example embodiment may set the activation order to minimize and/or reduce interference by taking into account relative positions of communication modules and a frequency band which each of the communication modules uses.

For example, referring to FIG. 8C, the communication controller 10 may set the activation order such that the Wi-Fi communication module WF is activated, the Zigbee communication module ZB is activated, and then the Bluetooth communication module BT is activated. For example, the communication controller 10 may set the activation order such that the Wi-Fi communication module WF is activated and then the Zigbee communication module ZB which is relatively distant from the Wi-Fi communication module WF is activated, thereby decreasing interference more with respect to the situation illustrated in FIG. 8B in which adjacent modules are activated in order.

In other words, the communication controller 10 may set the activation order in consideration of the distance between already designed communication modules such that a certain distance between communication modules using adjacent frequency bands is secured.

As described above, in the communication apparatus 1 in accordance with an example embodiment, the positions of the communication modules may be designed beforehand in consideration of frequency bands thereof. Furthermore, the communication apparatus 1 in accordance with an example embodiment may set the activation order in consideration of relative positions of already designed communication modules such that interference between the communication modules is minimized and/or reduced. Thus, software interference may be also minimized and/or reduced. For example, the communication apparatus 1 may be designed in consideration of the relative positions of the communication modules or the activation order or the like may be set in consideration of the relative positions of the communication modules after the communication apparatus 1 is designed, thereby reducing problems caused by interference.

As another example, in order to minimize and/or reduce interference between communication modules using the same frequency band or similar frequency bands, the communication controller 10 may divide into sub-bands a frequency band between communication modules using the same frequency band or similar frequency bands among the communication modules included in the communication unit 2 so that these communication modules may respectively use the sub-bands of the frequency band.

In an example embodiment, the communication controller 10 may divide a frequency band between 2.4 GHz and 2.5 GHz which a Wi-Fi communication module, a Bluetooth communication module, and a Zigbee communication module use into N sub-bands (here, N≥2), and support the N sub-bands of the frequency band to be respectively used by the Wi-Fi communication module, the Bluetooth communication module, and the Zigbee communication module. In addition, the communication controller 10 may perform various methods to avoid interference. As described above, the communication apparatus 1 may be separately provided or may be included in one of IoT devices. Accordingly, an example in which a communication apparatus is included in a display apparatus as one of IoT devices will be described in greater detail below.

Figure 9:
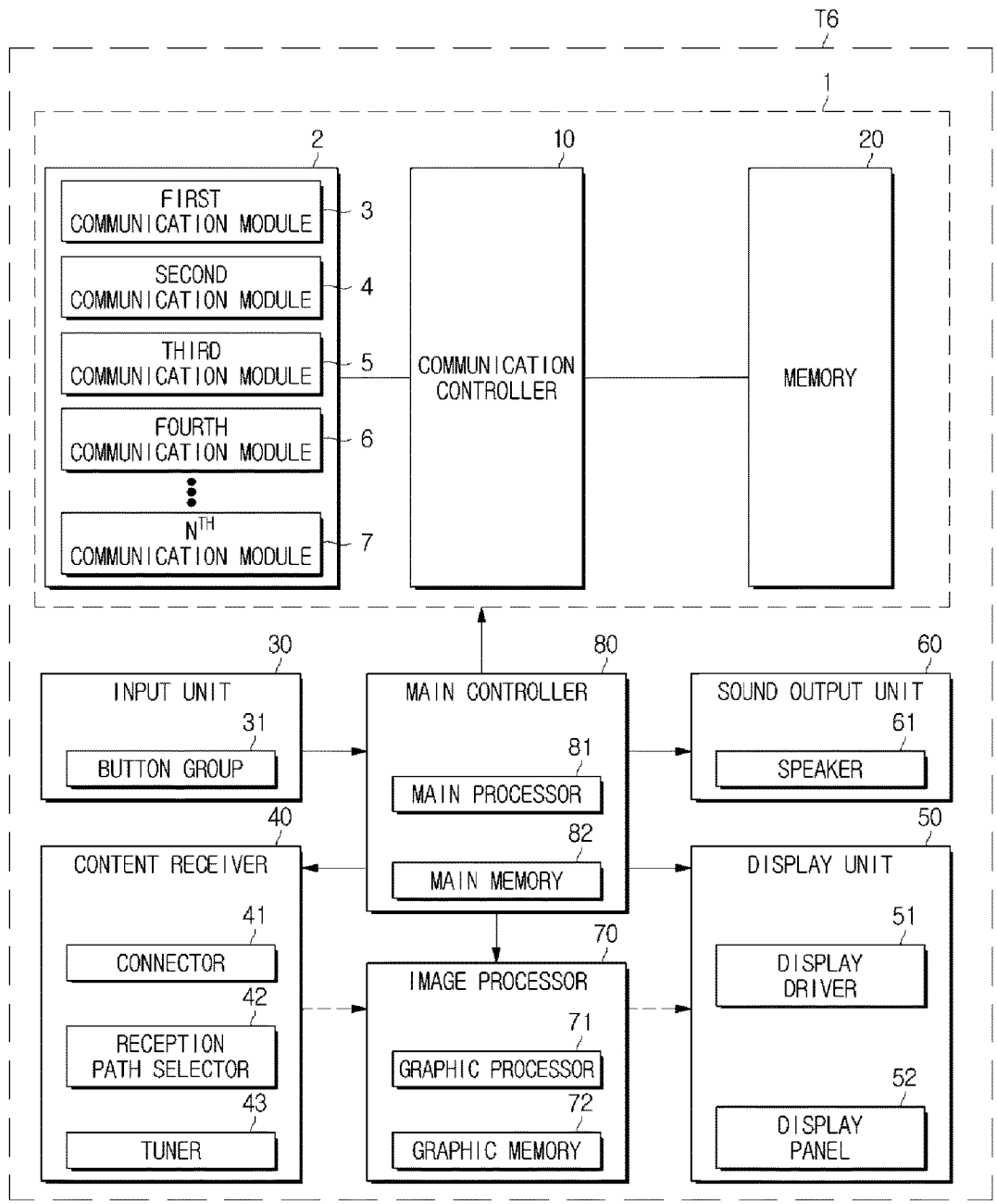
FIG. 9 is a block diagram illustrating an example display apparatus including a communication apparatus therein in accordance with an example embodiment of the present disclosure.

FIG. 9 is a block diagram illustrating an example display apparatus including a communication apparatus therein in accordance with an example embodiment of the present disclosure.

The display apparatus T6 may refer, for example, to an apparatus which includes a display panel to display an image and may thus display a broadcast signal or image data having various formats. Referring to FIG. 9, the display apparatus T6 includes an input unit 30 including various input circuitry via which a control command may be received from a user, a content receiver 40, including various circuitry for receiving content, which receives content containing images and sound from an external device, an image processor 70 which processes image data contained in content, a display unit 50 including a display which displays an image corresponding to image data contained in content, a sound output unit 60 which outputs sound corresponding to audio data contained in content, and a main controller 80 which controls overall operations of the display apparatus T6, as well as the communication apparatus 1 as described above.

For example, at least one among the communication apparatus 1, the content receiver 40, the image processor 70, and the main controller 80 may include various circuitry integrated on a system-on-chip (SoC) included in the display apparatus T6. However, a plurality of SoCs may be included in the display apparatus T6, and thus embodiments of the present disclosure are not limited thereto.

The input unit 30 may include various input circuitry, such as, for example, and without limitation a button group 31 through which various control commands are received from a user. For example, the button group 31 may include a volume button for controlling the volume of sound output from the sound output unit 60, a channel button for changing communication channels of content received via the content receiver 40, a power button for powering on/off the display apparatus T6, etc. The input unit 30 may receive various control commands related to the communication apparatus 1 from a user through the button group 31 described above.

Various buttons included in the button group 31 may employ various input circuitry, such as, for example, and without limitation, push switches and membrane switches configured to sense pressure applied by a user, touch switches configured to sense touching by a user's body, etc. However, embodiments of the present disclosure are not limited thereto, and the button group 31 may employ various input circuitry capable of outputting an electrical signal corresponding to the user's specific movement.

Furthermore, the input unit 30 may include a remote controller configured to remotely receive a control command from a user and transmit the user control command to the display apparatus T6, and may further include well-known various elements.

The content receiver 40 may receive various contents from various external devices using various content receiving circuitry. For example, the content receiver 40 may receive content from various content receiving circuitry, such as, for example, and without limitation, an antenna which wirelessly receives a broadcast signal, a set-top box which receives a broadcast signal wirelessly or via wire and appropriately transforms the broadcast signal, a multimedia reproducing device which reproduces contents stored in a multimedia storage medium (e.g., a digital versatile disc (DVD) player, a compact disc (CD) player, a Blueray player, or the like), etc.

For example, the content receiver 40 may include connectors 41 connected to an external device, a reception path selector 42 which selects a content receiving path from among the connectors 41, a tuner 43 which selects a channel (or a frequency) for receiving a broadcast signal, etc.

The connectors 41 may include, for example, and without limitation, a radio-frequency (RF) coaxial cable connector which receives a broadcast signal containing contents from an antenna, a high-definition multimedia interface (HDMI) connector which receives contents from a set-top box or a multimedia reproducing device, a component video connector, a composite video connector, a D-sub-connector, etc.

The reception path selector 42 may include various circuitry that selects a connector via which contents are to be received among the connectors 41 described above. For example, the reception path selector 42 may automatically select a connector 41 which receives contents among the connectors 41 or manually selects a connector 41 via which contents are to be received according to a user's control command.

The tuner 43 may include various tuning circuitry to extract a transmission signal of a specific frequency (or a specific channel) from various signals received via an antenna or the like when a broadcast signal is received. In other words, the tuner 43 may select a channel (or a frequency) for receiving contents according to a user's channel selection command.

The image processor 70 may process image content among contents received by the content receiver 40 and provide the processed image data to the display unit 50. In this example, the image processor 70 may include a graphic processor 71 and a graphic memory 72 as illustrated in FIG. 9.

The graphic processor 71 may process image data stored in the graphic memory 72 based on an image processing program stored in the graphic memory 72.

The graphic memory 72 may store an image processing program for processing images and image-processed data or may temporarily store image data output from the graphic processor 71 or image data received from the content receiver 40. The graphic memory 72 may be embodied as any of well-known various storage media like the memory 20 of FIG. 4.

Although the graphic processor 71 and the graphic memory 72 are described above as separate devices, they are not limited to being provided as separate chips and may be provided as a single chip together.

The display unit 50 may include the display panel 52 which visually displays an image, and a display driver 51 which drives the display panel 52.

The display panel 52 may include pixels which are units in which an image is displayed. Each of the pixels may receive an electrical signal representing image data, and output an optical signal corresponding to the received electrical signal. As described above, optical signals output from the pixels included in the display panel 52 are combined to form one image and the image is displayed on the display panel 52.

The display panel 52 may be classified into various types based on a method in which each of the pixels outputs an optical signal. For example, the display panel 52 may be classified into a light-emitting display in which pixels emit light, a transmissive display which blocks or transmit light emitted from a backlight unit or the like, or a reflective display which reflects or absorbs light incident thereon from an external light source.

For example, the display panel 52 may be embodied as a cathode ray tube (CRT) display, a liquid crystal display (LCD) panel, a light-emitting diode (LED) panel, an organic light-emitting diode (OLED), a plasma display panel (PDP), a field emission display (FED) panel, or the like.

However, the display panel 52 is not limited thereto, and various means capable of visually displaying an image corresponding to image data may be embodied as the display panel 52.

The display driver 51 may drive the display panel 52 to receive image data from the image processor 70 and display an image corresponding to the image data according to a control signal received from the main controller 80.

The sound output unit 60 may include various output circuitry to output sound corresponding to sound data among content received by the content receiver 40 according to a control signal received from the main controller 80. Furthermore, the sound output unit 60 may output sound corresponding sound data among data received by the communication unit 2 but embodiments of the present disclosure are not limited thereto. In this example, the sound output unit 60 may include one or two or more speakers 61 which convert an electrical signal into a sound signal.

A main memory 82 may store a control program and control data for controlling operations of the display apparatus T6, and may temporarily store a user control command received via the input unit 30 or a control signal output from a main processor 81.

The main processor 81 may include various processing circuitry to process various data stored in the main memory 82 based on the control program stored in the main memory 82. For example, the main processor 81 may process a control command received via the input unit 30, generate a channel selection signal for selecting a path in which the content receiver 40 receives contents based on the control command, and generate a volume control signal for controlling the volume of sound output from the sound output unit 60 based on the control command.

Furthermore, the main processor 81 may transmit a control signal to the communication apparatus 1 based on a control command received via the input unit 30 so as to control another IoT device provided indoors or control downloading of various data from a web server.

Although the main processor 81 and the main memory 82 are described above as separate devices, they are not limited to being provided as separate chips and may be provided as a single chip.

The main controller 80 may control operations of various elements included in the display apparatus T6 based on a control command received from a user. For example, the main controller 80 may control the image processor 70 to image-process image data received by the content receiver 40 and the display unit 50 to display the image-processed image data.

Furthermore, the main controller 80 may control overall operations of the communication apparatus 1 based on a control signal. Thus, the display apparatus T6 in accordance with an example embodiment may serve as a home hub, and control an operation of the communication apparatus 1 through the main controller 80 to control activation of communication modules. The communication apparatus 1 has been described above in detail and the description thereof will not be repeated here.

A flow of an operation of a communication apparatus which receives a pairing signal and is connected to an IoT device via a communication network will be described in greater detail below.

Figure 10:
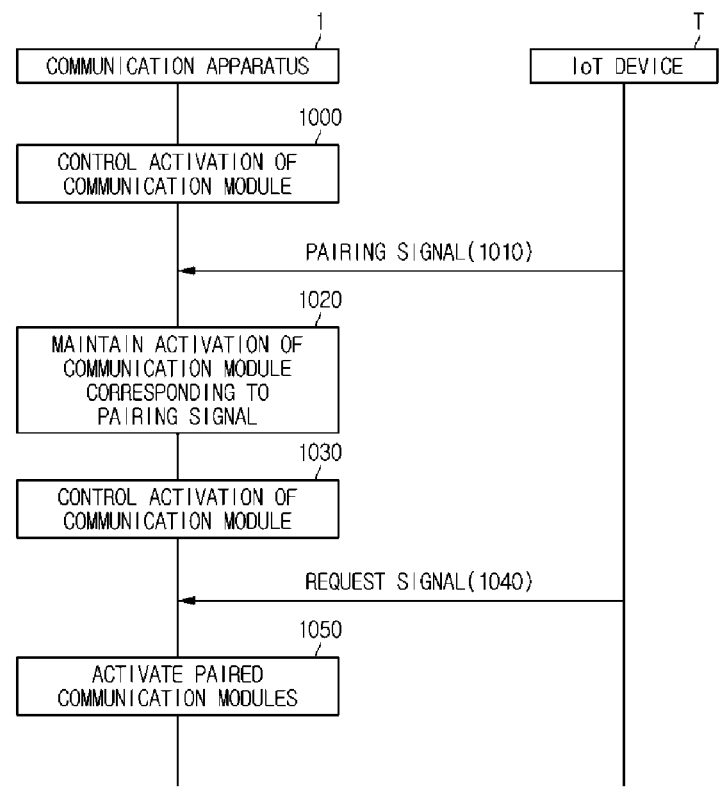
FIG. 10 is a flowchart illustrating example operation of a communication apparatus which transmits a radio signal to or receives a radio signal from an IoT device in accordance with an example embodiment.
Figure 11:
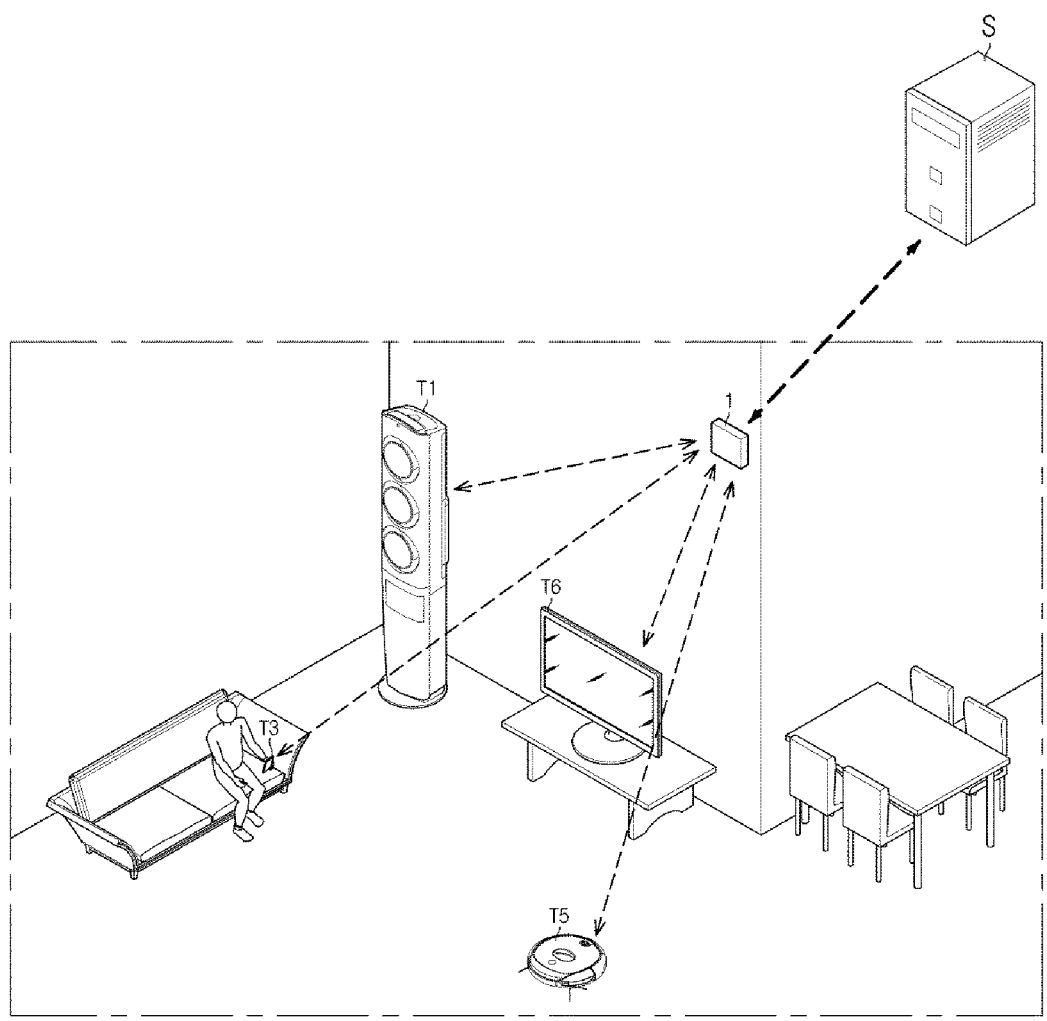
FIG. 11 is a diagram illustrating the relationship between a communication apparatus and an IoT device in accordance with an example embodiment.

FIG. 10 is a flowchart illustrating an example operation of a communication apparatus which transmits a radio signal to or receives a radio signal from an IoT device in accordance with an example embodiment. FIG. 11 is a diagram illustrating an example relationship between a communication apparatus and an IoT device in accordance with an example embodiment.

The communication apparatus 1 may be included in an IoT device T or provided as a separate apparatus as illustrated in FIG. 11. Pairing between the communication apparatus 1 and the IoT device T may be required so that they may be connected to each other via a wireless communication network. Thus, the communication apparatus 1 may control activation of communication modules to receive a pairing signal requesting pairing and reduce power consumed due to the activation of the communication modules (1000).

For example, the communication apparatus 1 may set various parameters such as activation times, activation cycles, an activation order, etc. of the communication modules, and control the communication modules to be 'on' or 'off' based on the set parameters. A method of setting the parameters may be determined beforehand by a user or the designer of the communication apparatus 1. Furthermore, the communication apparatus 1 may collect use history information to obtain a use pattern and set the parameters on the basis of the use pattern, thereby supporting a customized service.

The IoT device T may transmit the pairing signal to the communication apparatus 1 (1010). In this example, the communication apparatus 1 may receive the pairing signal only when a communication module which is to be paired using the pairing signal is activated.

However, the IoT device T does not transmit the pairing signal only once and may transmit the pairing signal a plurality of times based on a communication protocol. Thus, when the activation time, the activation cycle, etc. are appropriately set, a user may use a communication network without feeling inconvenience.

A process required to perform pairing is set based on the communication protocol. The communication apparatus 1 may perform pairing with the IoT device T based on the communication protocol. The communication apparatus 1 may maintain the activation of the communication module while pairing is performed (1020). In other words, the communication apparatus 1 may supply power to the communication module until the pairing is completed.

For example, when Bluetooth pairing is first performed using a Bluetooth communication network, it is required to perform a security process between the communication apparatus 1 and the IoT device T. However, when the Bluetooth pairing is first completed, the security process is not required any longer when pairing is performed again.

When the security process is completed, a link manager protocol (LMP) connection may be performed between the communication apparatus 1 and the IoT device T. In this example, an LMP may be firmware type software for setting a link between Bluetooth paired devices, and may be stored in the memory 20 of the communication apparatus 1. For example, a link for exchanging data between the communication apparatus 1 and the IoT device T which are Bluetooth paired with each other using the LMP may be set for the communication apparatus 1.

After the pairing is completed, the communication module does not perform any process unless a request signal is received from the IoT device T. Thus, the communication apparatus 1 may control the communication modules to be sequentially activated in a predetermined order (1030). Thus, the communication apparatus 1 may control the supply of power to the communication modules to reduce power consumption while performing pairing with the IoT device T normally. In this example, the communication apparatus 1 may also control the communication modules to be sequentially activated as described above and a detailed description of the controlling of the activation of the communication modules will not be repeated here.

The communication apparatus 1 may receive a request signal from the IoT device T (1040). For example, the request signal may refer, for example, to a radio signal containing a request for specific data or a specific command and which is transmitted via a communication network.

When the request signal is received during activation of a communication module, the communication apparatus 1 may perform a process corresponding to the request signal while maintaining the activation of the communication module (1050). For example, the communication apparatus 1 may transmit a control command to download data corresponding to the request signal from a web server or to run another IoT device, and may further perform various other processes. Thus, the communication apparatus 1 may display, on a display panel, various information, such as information downloaded from a web server, processing information regarding an IoT device, etc., while being linked with the display apparatus T6 of FIG. 1.

As another example, when the smart phone T3 of FIG. 2 and the communication apparatus 1 are connected to each other via a Wi-Fi communication network, the smart phone T3 may be connected to the external web server S of FIG. 2 via the communication apparatus 1 to download data requested by a user, transmit a control command to the robot cleaner T5 via the communication apparatus 1, or perform various other processes. In this connection, FIG. 11 illustrates an example in which the communication apparatus 1 is a separate apparatus, and IoT devices T1, T3, T5, T6 may be connected to the external server S via the communication apparatus 1 as set forth above with respect to FIG. 2.

The example embodiments set forth herein and the elements illustrated in the drawings are merely examples of the present disclosure, and thus various modified examples that may replace or modify these example embodiments and the drawings are also contemplated.

The terminology used herein is for the purpose of describing particular example embodiments only and is not intended to be limiting. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof.

It will be understood that, although the terms 'first', 'second,' etc., may be used herein to describe various elements, these elements are not limited by these terms. These terms are used simply to distinguish one element from another element. Thus, a first element discussed below could be termed a second element and vice versa without departing from the teachings of the present disclosure. The term 'and/or' includes any and all combinations of one or more of the associated listed items.

Throughout the present disclosure, the terms 'unit', 'device', 'block', 'member', 'module', etc. may be understood as units including circuitry for performing at least one function or operation. For example, these terms may be understood as software or hardware circuitry such as, for example, and without limitation, processing circuitry (e.g., including a CPU), a field-programmable gate array (FPGA) or an application-specific integrated circuit (ASIC). However, these terms are not limited to being understood as software or hardware, and may be understood as elements that may be stored in an accessible storage medium and performed by one or more processors including processing circuitry.

Although example embodiments of the present disclosure have been illustrated and described, it would be appreciated by those skilled in the art that changes may be made in these embodiments without departing from the principles and spirit of the disclosure, the scope of which is defined in the claims and their equivalents.

What is claimed is:

1. A communication apparatus comprising:
   a communication unit including a plurality of communication modules, each communication module comprising communication circuitry, the communication unit configured to support different wireless communication methods, so that each communication module supports a different wireless communication protocol; and
   a communication controller including at least one of a processor, and configured to:
      sequentially activate the different respective wireless communication protocols in a predetermined order,
      collect access information of a device operably connected to the communication unit and to analyze a use pattern based on the collected access information, and
      adjust respective lengths of active periods of the respective communication modules based on an analysis of pairing frequency for the respective communication modules and an analysis of the use pattern.

2. The communication apparatus according to claim 1, wherein the communication controller is configured to control the activation of the plurality of communication modules by sequentially supplying power to the communication modules in the predetermined order.

3. The communication apparatus according to claim 1, wherein the communication controller is configured to set at least one of an active period and an inactive period based on the analyzed use pattern, wherein at least one communication module is activated in the active period and all of the plurality communication modules are deactivated in the inactive period.

4. The communication apparatus according to claim 1, wherein the communication controller is configured to set an activation order of the plurality of communication modules based on the analyzed use pattern.

5. The communication apparatus according to claim 1, wherein the communication controller is configured to determine time zones in which a communication method is used by the device based on the analyzed use pattern, and to set an active period and an inactive period in units of the time zones based on the time zones.

6. The communication apparatus according to claim 1, wherein the communication controller is configured to control the activation of the plurality of communication modules based on a relative position and a frequency band of each of the plurality of communication modules.

7. The communication apparatus according to claim 1, wherein the communication controller is configured to provide a user interface through which activation information is received from the device including the communication apparatus therein or the device connected to the communication apparatus via the communication unit.

8. The communication apparatus according to claim 7, wherein the communication controller is configured to control the activation of at least one communication module based on the activation information received via the user interface.

9. The communication apparatus according to claim 7, wherein the communication controller is configured to provide information regarding efficiency expected from the activation information received via the user interface.

10. The communication apparatus according to claim 1, wherein the communication controller is configured to transmit activation information to the device operably connected to the communication apparatus via the communication unit.

11. A display apparatus comprising:
an input unit comprising input circuitry configured to receive a control command;
a communication apparatus including a plurality of communication modules, each communication module comprising communication circuitry and each of the communication modules supporting a different respective wireless communication protocol,
the communication apparatus configured to:
sequentially activate the different respective wireless communication protocols in a an predetermined order,
collect access information of a device operably connected to the communication apparatus,
analyze a use pattern based on the collected access information, and
adjust respective lengths of active periods of the respective communication protocols based on an analysis of pairing frequency for the respective communication modules and an analysis of the use pattern; and
a display panel configured to display information processed by an activated communication module among the plurality of communication modules.

12. The display apparatus according to claim 11, wherein the communication apparatus is configured to control the sequential activation of the plurality of communication modules by sequentially supplying power to the at least one communication module in the predetermined order.

13. The display apparatus according to claim 11, wherein the communication apparatus is configured to set at least one of an active period and an inactive period based on the analyzed use pattern, wherein at least one communication module is activated in the active period and all of the plurality of communication modules are deactivated in the inactive period.

14. The display apparatus according to claim 11, wherein the communication apparatus is configured to set an activation order of the plurality of communication modules based on the analyzed use pattern.

15. The display apparatus according to claim 11, wherein the communication apparatus is configured to determine time zones in which a communication method is used by the device based on the analyzed use pattern, and to set an active period and an inactive period in units of the time zones based on the time zones.

16. The display apparatus according to claim 11, wherein the communication apparatus is configured to control the activation of the plurality of communication modules based on a relative position and a frequency band of each of the plurality of communication modules.

17. The display apparatus according to claim 11, wherein the display panel is configured to display a user interface through which activation information regarding the communication apparatus is received.

18. The display apparatus according to claim 17, wherein the communication apparatus is configure to control the activation of at least one communication module based on the activation information received via the user interface.

* * * * *